United States Patent
Herwig et al.

(10) Patent No.: US 7,617,982 B1
(45) Date of Patent: Nov. 17, 2009

(54) COMPUTER PERIPHERAL WITH INTEGRATED PRINTER AND BAR CODE READER

(75) Inventors: Nathaniel Christopher Herwig, Lawrenceville, GA (US); Joanne S. Walter, Blue Ridge, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/659,659

(22) Filed: Sep. 10, 2003

(51) Int. Cl.
*G06F 17/00* (2006.01)
*G06F 19/00* (2006.01)

(52) U.S. Cl. .......................... 235/462.15; 235/462.11; 235/462.24

(58) Field of Classification Search ............ 235/462.15, 235/462.11, 462.24, 462.41, 462.43, 462.01, 235/375; 358/1.15; 705/21
See application file for complete search history.

(56) References Cited

U.S. PATENT DOCUMENTS

| | | | | |
|---|---|---|---|---|
| 5,781,708 A * | 7/1998 | Austin et al. | ............ | 358/1.6 |
| 5,938,354 A * | 8/1999 | Yasui et al. | ............ | 400/621 |
| 5,975,417 A * | 11/1999 | Spencer et al. | ......... | 235/462.36 |
| 5,978,772 A * | 11/1999 | Mold | ............ | 705/16 |
| 6,002,844 A * | 12/1999 | Kishida et al. | ............ | 358/1.15 |
| 6,058,441 A * | 5/2000 | Shu | ............ | 710/100 |
| 6,126,340 A * | 10/2000 | Ono et al. | ............ | 400/70 |
| 6,246,995 B1 * | 6/2001 | Walter et al. | ............ | 705/22 |
| 6,311,165 B1 * | 10/2001 | Coutts et al. | ............ | 705/21 |
| 6,415,337 B1 * | 7/2002 | Chung | ............ | 710/16 |
| 6,550,683 B1 * | 4/2003 | Augustine | ............ | 235/462.45 |
| 6,598,795 B1 * | 7/2003 | Prenn | ............ | 235/462.01 |
| 6,612,494 B1 * | 9/2003 | Outwater | ............ | 235/462.04 |
| 6,619,549 B2 * | 9/2003 | Zhu et al. | ............ | 235/462.45 |
| 6,701,192 B1 * | 3/2004 | Herwig | ............ | 700/19 |
| 6,710,895 B1 * | 3/2004 | Gatto et al. | ............ | 358/1.6 |
| 6,786,655 B2 * | 9/2004 | Cook et al. | ............ | 355/40 |
| 6,947,171 B1 * | 9/2005 | Narusawa et al. | ............ | 358/1.6 |
| 2002/0175208 A1 * | 11/2002 | Bartley et al. | ............ | 235/380 |
| 2005/0035198 A1 * | 2/2005 | Wilensky | ............ | 235/383 |
| 2005/0187826 A1 * | 8/2005 | Wike et al. | ............ | 705/21 |

FOREIGN PATENT DOCUMENTS

JP 2003118085 A * 4/2003

* cited by examiner

*Primary Examiner*—Edwyn Labaze
(74) *Attorney, Agent, or Firm*—Paul W. Martin

(57) ABSTRACT

A computer peripheral with integrated printer and bar code reader which saves space on countertops. The computer peripheral includes a printer, including a housing, a bar code reader in the housing, and control circuitry in the housing for facilitating communication of data between the printer and a computer and between the bar code reader and the computer over a single cable.

10 Claims, 2 Drawing Sheets

COMPUTER PERIPHERAL WITH INTEGRATED PRINTER AND BAR CODE READER

BACKGROUND OF THE INVENTION

The present invention relates to computer peripherals used in retail establishments, and more specifically to a computer peripheral with integrated printer and bar code reader.

In virtually all store formats, the POS solution includes various displays, a keyboard, printer, and scanner. In certain retail formats, such as department stores and specialty stores, typical transactions consist of a small number of items. Therefore, large scanners are unnecessary. A small "presentation" scanner is typically used.

However, a presentation scanner can often become a nuisance—"always in the way" of the cashier or constantly getting "buried" under merchandise. Therefore, it would be desirable to provide a computer peripheral with integrated printer and bar code reader to reduce clutter and cabling and to improve general productivity at the checkout station.

SUMMARY OF THE INVENTION

In accordance with the present invention, a computer peripheral with integrated printer and bar code reader is provided.

A computer peripheral with integrated printer and bar code reader which saves space on countertops. The computer peripheral includes a printer, including a housing, a bar code reader in the housing, and control circuitry in the housing for facilitating communication of data between the printer and a computer and between the bar code reader and the computer over a single cable.

It is accordingly an object of the present invention to provide a computer peripheral with integrated printer and bar code reader.

It is another object of the present invention to provide a computer peripheral with integrated printer and bar code reader in order to increase available counter space and consolidate cabling.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION

Figure 1:
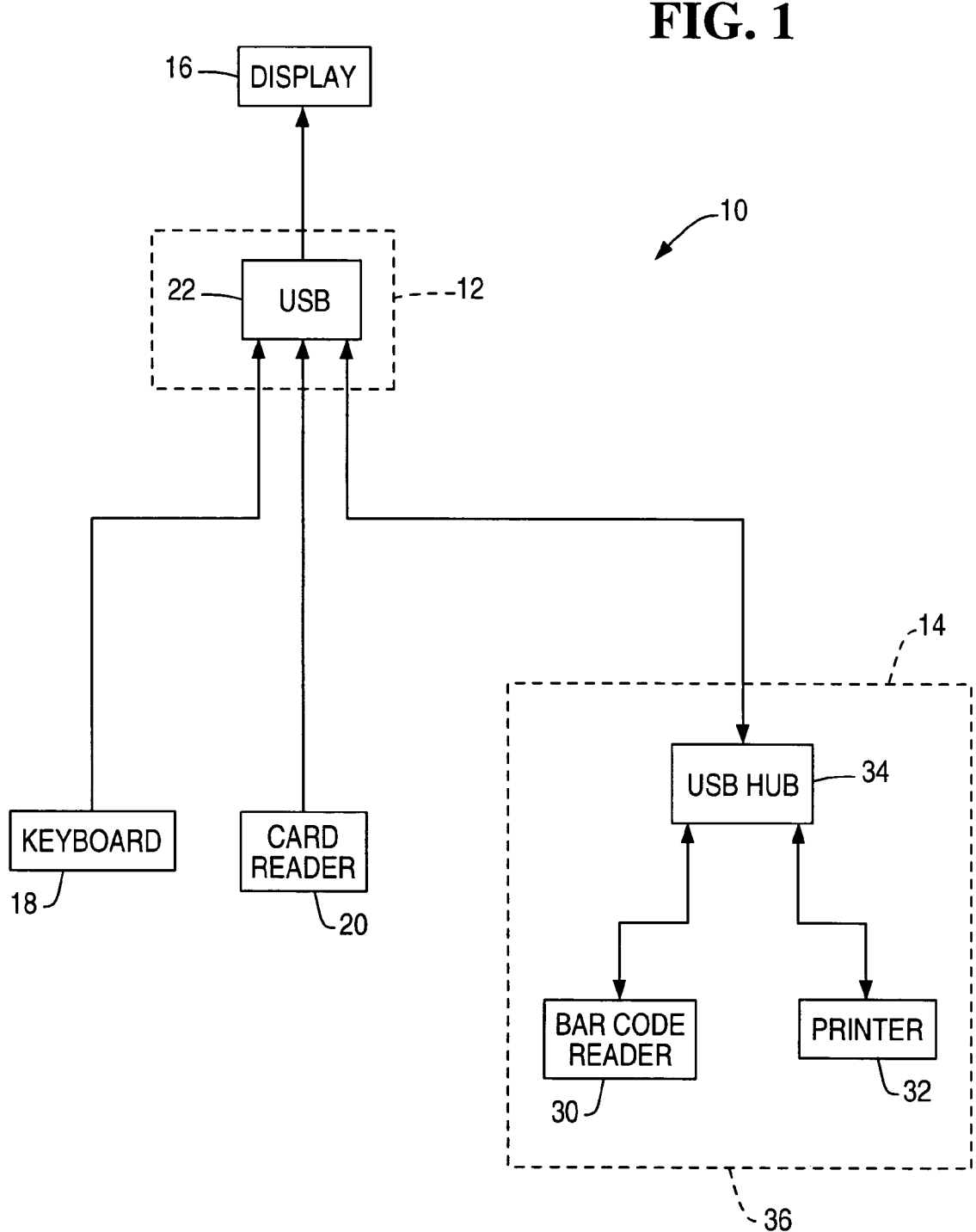
FIG. 1 is a block diagram of a transaction system with the peripheral of the present invention.

Referring to FIG. 1, transaction system 10 primarily includes transaction terminal 12, peripheral 14, display 16, keyboard 18, and card reader 20.

Transaction terminal 12 determines information about purchased products and processes payment. Transaction terminal 12 includes universal serial bus (USB) controller 22 for communicating with peripheral 14, display 16, keyboard 18, and card reader 20. Other input/output controllers and communication techniques are also envisioned, such as RS-232, RS-485, Firewire, and Bluetooth and other wireless techniques.

Peripheral 14 includes bar code reader 30 and printer 32, both in the same housing 36.

Bar code reader 30 is preferably a charge coupled device (CCD) scanner, or other type of imaging scanner.

Printer 32 may include an NCR 7167 multi-function printer.

In a preferred embodiment, housing 36 is the housing of printer 32. Bar code reader 30 is small enough to fit inside of housing 36.

Peripheral 14 also includes USB hub 34 for connecting bar code reader 30 and printer 32 to transaction terminal 12. Other connection methods are also envisioned when other types of communication techniques are used.

Display 16 may include a cathode ray tube (CRT) or liquid crystal display.

A touch screen may replace keyboard 18 and display 16.

Card reader 20 reads payment cards, such as credit, debit, and smart cards. Card reader 20 may also read loyalty cards.

Transaction system 10 may include additional peripherals as necessary to accomplish its purpose.

Figure 2:
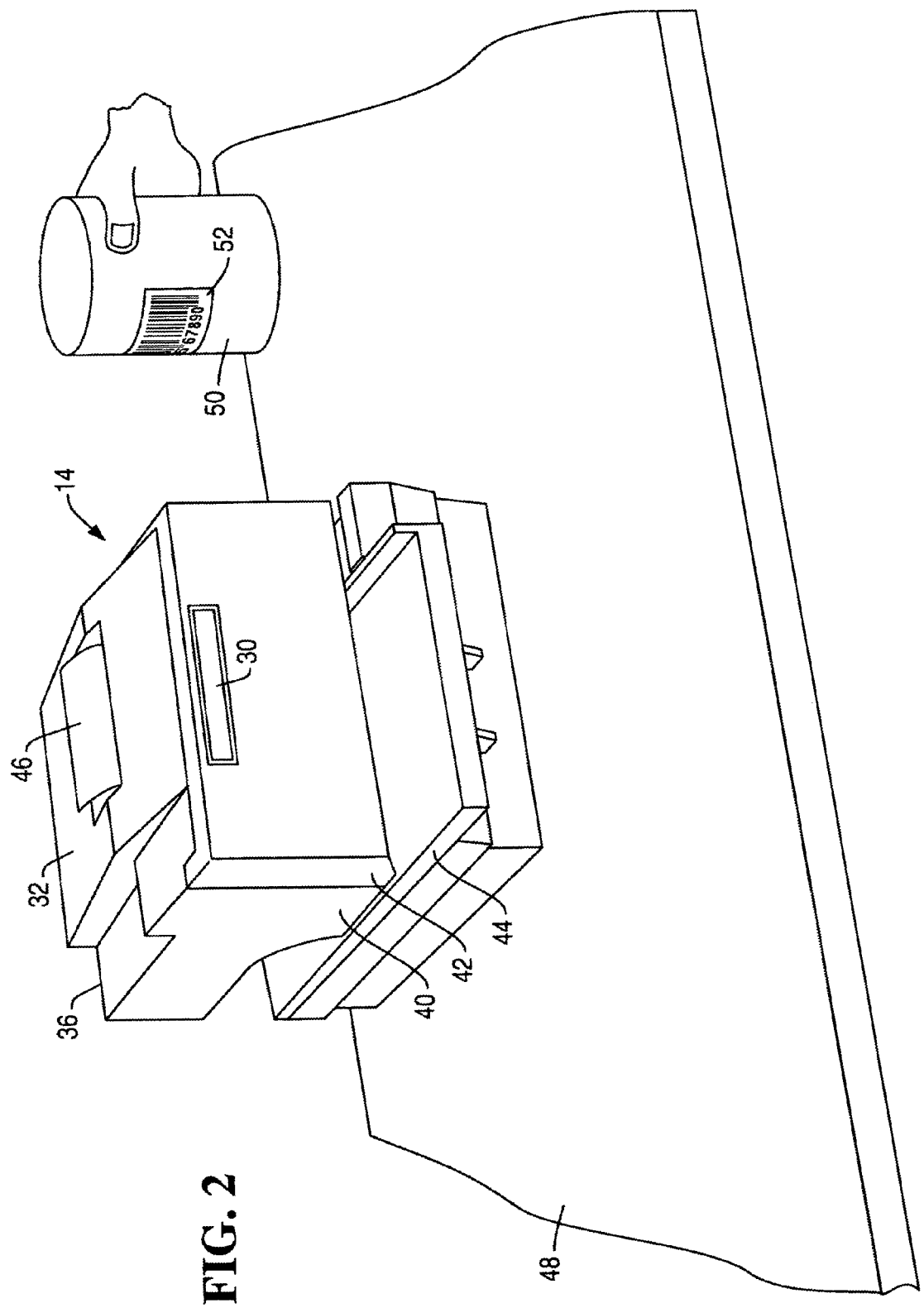
FIG. 2 is a perspective view of one example implementation of the peripheral.

Turning now to FIG. 2, an example peripheral 14 is shown. Peripheral 14 is based on the NCR 7167 multi-function printer.

Printer 32 is located in the top rear section. Printer 32 is a thermal printer for printing receipt 46.

Bar code reader 30 may be located in the top front section of housing 36, or in any other location where bar code reader 32 will not interfere with other components in peripheral 14. In the example peripheral of FIG. 2, bar code reader 30 is mounted to the top cover portion of housing 36. Bar code reader 32 is accessible through an opening in the front surface of the top cover portion. Bar code reader 30 may also be located in the top or side surfaces of housing 36.

Bar code reader 32 functions as a presentation scanner. A checker presents bar code 52 of item 50 to bar code reader 30.

Peripheral 14 also includes an impact printer 42 for printing information on the backs of checks passed through magnetic ink character recognition (MICR) reader 40 on slip table 44.

Peripheral 14 has several advantages. It reduces space and clutter on the countertop and reduces the opportunity for a separate bar code reader to "get lost" under merchandise, papers, etc. It reduces the possibility of a separate scanner to be dropped and broken. It leverages the proximity of the printer in most checkout stands to put the bar code reader in a convenient, predictable location. It improves reliability since a single cable to transaction terminal 12, instead of separate cables, is required. Finally, it reduces the number of input/output connections required by transaction terminal 12, so it potentially helps reduce the size and cost of transaction terminal 12.

Although the present invention has been described with particular reference to certain preferred embodiments thereof, variations and modifications of the present invention can be effected within the spirit and scope of the following claims.

What is claimed is:

1. A computer peripheral comprising:
   a peripheral housing for containing only two normally separately housed peripherals for saving space at a checkout station including a receipt printer and a bar code reader; and
   control circuitry in the housing for facilitating communication of receipt data reflecting a sale of products between the printer and a separately housed controlling transaction computer at the checkout station and bar code data from the products between the bar code reader and the separately housed controlling transaction computer over a single cable during the sale of the products completed by the transaction computer.

2. The peripheral of claim 1, wherein the bar code reader comprises an imaging scanner.

3. The peripheral of claim 2, wherein the imaging scanner comprises a charge coupled device scanner.

4. The peripheral of claim 1, wherein the bar code reader comprises a presentation scanner.

5. The peripheral of claim 1, wherein the housing was originally designed to only contain the printer, and wherein the bar code reader is located in a position in the housing that does not interfere with operation of the printer.

6. The peripheral of claim 1, wherein the control circuitry comprises a universal serial bus hub.

7. A computer peripheral comprising:
a peripheral housing for containing only two normally separately housed peripherals for saving space at a checkout station including a universal serial bus receipt printer and a universal serial bus charge coupled device scanner, wherein the scanner functions as a presentation scanner and is located in a position in the housing that does not interfere with operation of the receipt printer; and
a universal serial bus hub in the housing for facilitating communication of receipt data reflecting a sale of products between the printer and a separately housed controlling transaction computer at the checkout station and bar code data from the products between the bar code reader and the separately housed controlling transaction computer over a single cable during the sale of the products completed by the transaction computer.

8. A transaction system comprising:
a controlling transaction computer at a checkout station, including a universal serial bus controller; and
a computer peripheral at the checkout station and separately housed from the controlling transaction computer including
a peripheral housing for containing only two normally separately housed peripherals for saving space at the checkout station including a universal serial bus receipt printer and a universal serial bus charge coupled device scanner, wherein the scanner functions as a presentation scanner and is located in a position in the housing that does not interfere with operation of the receipt printer; and
a universal serial bus hub in the housing for facilitating communication of receipt data reflecting a sale of products between the printer and the transaction computer and bar code data from the products between the bar code reader and the transaction computer over a single cable between the universal serial bus hub and the universal serial bus controller during the sale of the products completed by the transaction computer.

9. A computer peripheral comprising:
a peripheral housing containing normally separately housed peripherals for saving space at a checkout station including an impact printer, a magnetic ink character reader, a receipt printer, and a bar code reader; and
control circuitry in the housing for facilitating communication of receipt data reflecting a sale of products between the printer and a separately housed controlling transaction computer at the checkout station and bar code data from the products between the bar code reader and the separately housed controlling transaction computer over a single cable, for operating the magnetic ink character reader to read magnetic ink characters on checks, for operating the impact printer to print information on the checks during the sale of the products completed by the transaction computer.

10. A computer peripheral comprising:
a peripheral housing containing normally separately housed peripherals for saving space at a checkout station including a receipt printer and a bar code reader;
wherein the housing includes a generally vertical front surface containing an aperture and wherein the barcode reader is located within the housing between the receipt printer and the aperture; and
control circuitry in the housing for facilitating communication of receipt data reflecting a sale of products between the printer and a separately housed controlling transaction computer at the checkout station and bar code data from the products between the bar code reader and the separately housed controlling transaction computer over a single cable during the sale of the products completed by the transaction computer.

* * * * *